(12) United States Patent
Takahashi

(10) Patent No.: US 10,908,565 B2
(45) Date of Patent: Feb. 2, 2021

(54) CALCULATION METHOD, INFORMATION PROCESSING APPARATUS, AND STORAGE MEDIUM STORING COMPUTER PROGRAM

(71) Applicant: BROTHER KOGYO KABUSHIKI KAISHA, Nagoya (JP)

(72) Inventor: Eisuke Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/440,005

(22) Filed: Jun. 13, 2019

(65) Prior Publication Data

US 2020/0004211 A1 Jan. 2, 2020

(30) Foreign Application Priority Data

Jun. 27, 2018 (JP) .................................. 2018-122175

(51) Int. Cl.
G05B 13/04 (2006.01)
(52) U.S. Cl.
CPC .................................. G05B 13/042 (2013.01)
(58) Field of Classification Search
CPC .................................................... G05B 13/042
See application file for complete search history.

(56) References Cited

U.S. PATENT DOCUMENTS

| | | | |
|---|---|---|---|
| 2005/0228513 A1 | 10/2005 | Nihei et al. | |
| 2007/0002113 A1* | 1/2007 | Akiyama | B41J 11/485 347/101 |
| 2007/0085505 A1* | 4/2007 | Akiyama | G05B 19/33 318/575 |
| 2013/0057191 A1* | 3/2013 | Yoshiura | H02P 23/04 318/600 |
| 2014/0142761 A1* | 5/2014 | Mori | G03G 15/1615 700/275 |
| 2017/0090444 A1 | 3/2017 | Takahashi | |

FOREIGN PATENT DOCUMENTS

| | | |
|---|---|---|
| JP | 2000-148210 A | 5/2000 |
| JP | 2005-301508 A | 10/2005 |
| JP | 2017-068658 A | 4/2017 |

* cited by examiner

*Primary Examiner* — Charles R Kasenge
(74) *Attorney, Agent, or Firm* — Scully Scott Murphy and Presser

(57) ABSTRACT

A calculation method includes: acquiring one or more sets of time-series data including a sample u0 of control input u, a sample ym0 of first output ym, and a sample yf0 of second output yf; and calculating a value ρ* based on the time-series data, a transfer function C(ρ), and a model function Td that defines a normative value of the second output yf relative to a desired value r. The value ρ* is a value of parameter ρ that minimizes a control error and that is to be set to a control system. The control error is one of: an error between yf0 and a normative value of yf, the normative value of yf being calculated from C(ρ), Td, u0, and ym0; and an error between u0 and a normative value of the control input u, the normative value of u being calculated from C(ρ), Td, ym0, and yf0.

11 Claims, 8 Drawing Sheets

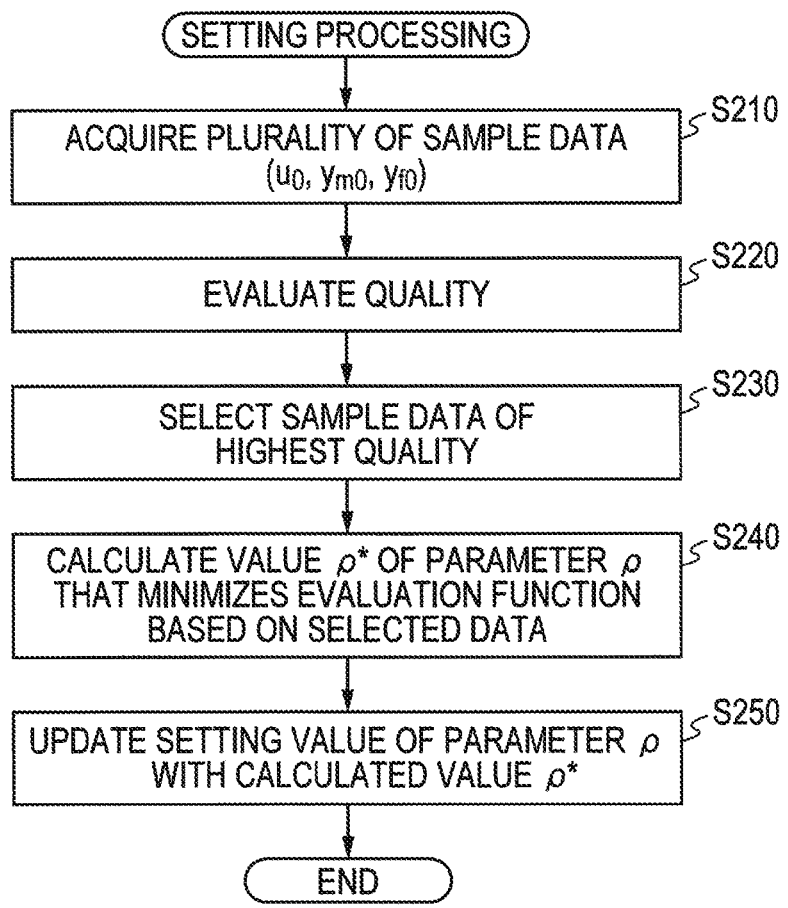

CALCULATION METHOD, INFORMATION PROCESSING APPARATUS, AND STORAGE MEDIUM STORING COMPUTER PROGRAM

CROSS REFERENCE TO RELATED APPLICATIONS

This application claims priority from Japanese Patent Application No. 2018-122175 filed Jun. 27, 2018. The entire content of the priority application is incorporated herein by reference.

TECHNICAL FIELD

This disclosure relates to a calculation method, an information processing apparatus, and a storage medium storing a computer program.

BACKGROUND

As an automatic adjustment technique of a controller, the FRIT (Fictitious Reference Iterative Tuning) technique and the VRFT (Virtual Reference Feedback Tuning) technique are conventionally known. These techniques are for adjusting parameters of the controller so as to be close to a target response.

SUMMARY

The above-described conventional technique is targeted at fully closed control, and is not optimized for semi-closed control. For example, when controlling an operation of a machine by a motor, the following processing is performed in the fully closed control and the semi-closed control, respectively.

In the fully closed control, the operation of the machine attached to the motor is observed. An observation value relating to the operation of this machine is used as a feedback amount, and a control input to the motor is determined by comparison between the feedback amount and a desired value (target command) In this way, the machine is controlled such that the operation of the machine follows the target response.

In the semi-closed control, the operation of the motor is observed. An observation value relating to the operation of this motor is used as a feedback amount, and the control input is determined by comparison between the feedback amount and the desired value. In this way, the machine is controlled such that the operation of the machine follows the target response.

The conventional technique assumes the fully closed control in which the same parameter as the parameter defining the target response is used as the feedback amount, and is not suitable for the semi-closed control in which the same parameter as the parameter defining the target response is not used as the feedback amount.

An aspect of an object of this disclosure is to provide a technique for setting a parameter (design variable) of a control system, especially a parameter of a semi-closed control system, to an appropriate value according to a target response.

According to one aspect, this specification discloses a calculation method of calculating a value of a parameter $\rho$ that is set to a control system. The control system is configured to calculate a control input u that follows a transfer function $C(\rho)$ including the parameter $\rho$ based on a desired value r and a first output ym that is an output of a first controlled element and, by manipulating the first controlled element based on the control input u, control a second output yf that is an output of a second controlled element that receives action from the first controlled element. The calculation method includes: acquiring one or more sets of time-series data including a sample u0 of the control input u, a sample ym0 of the first output ym, and a sample yf0 of the second output yf; and calculating a value $\rho^*$ based on the one or more sets of time-series data, the transfer function $C(\rho)$, and a model function Td that defines a normative value of the second output yf relative to the desired value r, the value $\rho^*$ being a value of the parameter $\rho$ that minimizes a control error and that is to be set to the control system. The control error is one of: an error between the sample yf0 of the second output yf and the normative value of the second output yf, the normative value of the second output yf being calculated from the transfer function $C(\rho)$, the model function Td, the sample u0 of the control input u, and the sample ym0 of the first output ym; and an error between the sample u0 of the control input u and a normative value of the control input u, the normative value of the control input u being calculated from the transfer function $C(\rho)$, the model function Td, the sample ym0 of the first output ym, and the sample yf0 of the second output yf.

According to another aspect, this specification also discloses an information processing apparatus configured to calculate a value of a parameter $\rho$ that is set to a control system. The control system is configured to calculate a control input u that follows a transfer function $C(\rho)$ including the parameter $\rho$ based on a desired value r and a first output ym that is an output of a first controlled element and, by manipulating the first controlled element based on the control input u, control a second output yf that is an output of a second controlled element that receives action from the first controlled element. The information processing apparatus includes: an interface; and a processor configured to perform: acquiring, through the interface, one or more sets of time-series data including a sample u0 of the control input u, a sample ym0 of the first output ym, and a sample yf0 of the second output yf; and calculating a value $\rho^*$ based on the one or more sets of time-series data, the transfer function $C(\rho)$, and a model function Td that defines a normative value of the second output yf relative to the desired value r, the value $\rho^*$ being a value of the parameter $\rho$ that minimizes a control error and that is to be set to the control system. The control error is one of: an error between the sample yf0 of the second output yf and the normative value of the second output yf, the normative value of the second output yf being calculated from the transfer function $C(\rho)$, the model function Td, the sample u0 of the control input u, and the sample ym0 of the first output ym; and an error between the sample u0 of the control input u and a normative value of the control input u, the normative value of the control input u being calculated from the transfer function $C(\rho)$, the model function Td, the sample ym0 of the first output ym, and the sample yf0 of the second output yf.

According to still another aspect, this specification also discloses a non-transitory computer-readable storage medium storing a set of program instructions for an information processing apparatus to calculate a value of a parameter $\rho$ that is set to a control system. The control system is configured to calculate a control input u that follows a transfer function $C(\rho)$ including the parameter $\rho$ based on a desired value r and a first output ym that is an output of a first controlled element and, by manipulating the first controlled element based on the control input u, control a second output yf that is an output of a second controlled element that receives action from the first controlled element. The set of program instructions, when executed by a processor of the information processing apparatus, causes the information processing apparatus to perform: acquiring one or more sets of time-series data including a sample u0 of the control input u, a sample ym0 of the first output ym, and a sample yf0 of the second output yf; and calculating a value ρ* based on the one or more sets of time-series data, the transfer function C(ρ), and a model function Td that defines a normative value of the second output yf relative to the desired value r, the value ρ* being a value of the parameter ρ that minimizes a control error and that is to be set to the control system. The control error is one of: an error between the sample yf0 of the second output yf and the normative value of the second output yf, the normative value of the second output yf being calculated from the transfer function C(ρ), the model function Td, the sample u0 of the control input u, and the sample ym0 of the first output ym; and an error between the sample u0 of the control input u and a normative value of the control input u, the normative value of the control input u being calculated from the transfer function C(ρ), the model function Td, the sample ym0 of the first output ym, and the sample yf0 of the second output yf.

BRIEF DESCRIPTION OF THE DRAWINGS

Embodiments in accordance with this disclosure will be described in detail with reference to the following figures wherein:

FIG. 10 is a flowchart showing setting processing according to a third embodiment.

DETAILED DESCRIPTION

Some aspects of this disclosure will be described while referring to the attached drawings.

First Embodiment

Figure 1:
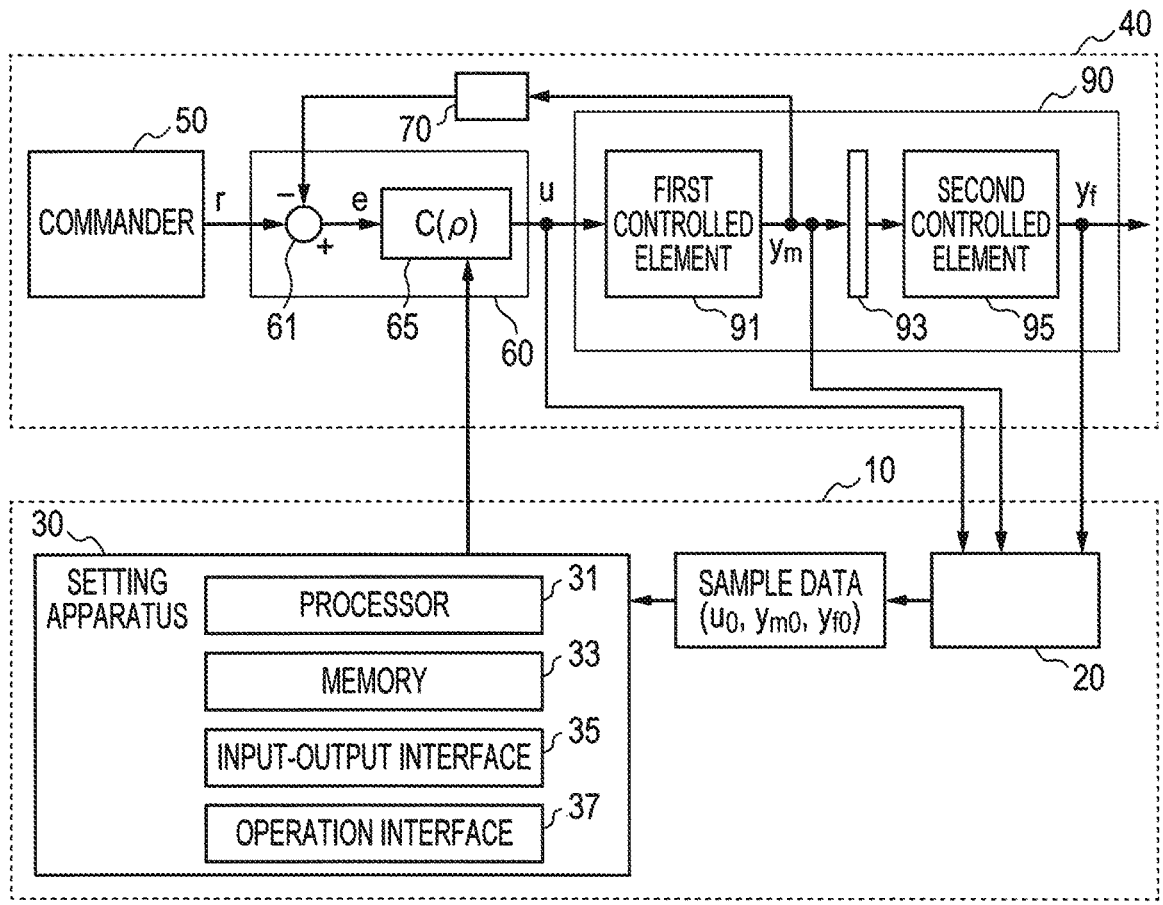
FIG. 1 is a block diagram showing the configuration of a setting system and a control system.

A setting system 10 of this embodiment shown in FIG. 1 is configured to calculate an appropriate value ρ* of a parameter ρ relating to a control system 40 by using a new technique based on the FRIT or VRFT technique, and to set the calculated appropriate value ρ* to the control system 40.

The setting system 10 includes an observer 20 and a setting apparatus 30. The observer 20 is configured to observe a control input u in the control system 40 and a first output ym and a second output yf as control outputs corresponding to the control input u. The observer 20 may include sensors required for observation and signal input terminals. The observer 20 is configured to input, to the setting apparatus 30, time-series data of a combination of the observed control input u, first output ym, and second output yf as sample data.

The setting apparatus 30 includes a processor 31, a memory 33, an input-output interface 35, and an operation interface 37. The processor 31 sets a value of a parameter ρ in the control system 40 by executing processing according to a program stored in the memory 33. The memory 33 includes a RAM and a flash memory.

Specifically, the processor 31 calculates the appropriate value ρ* of the parameter ρ based on the above-mentioned sample data inputted from the observer 20 through the input-output interface 35. The processor 31 sets the calculated appropriate value ρ* to the control system 40 through the input-output interface 35.

The control system 40 includes a commander 50, a controller 60, an observer 70, and a controlled object 90. The control system 40 corresponds to a semi-closed control system. The commander 50 is configured to input, to the controller 60, a value corresponding to a target control output as a desired value r.

The controller 60 includes a subtracter 61 and a main controller 65. The subtracter 61 is configured to calculate a deviation (difference) e=r−ym between the desired value r and the first output ym observed by the observer 70. The observer 70 is configured to observe the first output ym. The observer 70 may include sensors required for observation of the first output ym.

The main controller 65 is configured to calculate the control input u corresponding to the deviation e in accordance with a set transfer function C(ρ) (u=C(ρ)·e). The value of a parameter ρ included in the transfer function C(ρ) is updated from an initial value to the above-mentioned appropriate value ρ* by the setting system 10. The control system 40 may include a storage device (not shown) for keeping the value of the parameter ρ set by the setting system 10. The controller 60 manipulates the controlled object 90 by using the control input u calculated by the main controller 65.

The controlled object 90 includes a first controlled element 91, a transfer element 93, and a second controlled element 95. The first controlled element 91 is manipulated by the controller 60 by using the above-mentioned control input u. The transfer element 93 receives, from the first controlled element 91, action corresponding to the first output ym that is the control output of the first controlled element 91, and transfers that action to the second controlled element 95.

The second controlled element 95 operates by receiving action corresponding to the above-mentioned first output ym from the first controlled element 91 through the transfer element 93. In this way, the second controlled element 95 passively executes an operation corresponding to the first output ym, and a second output yf as the control output of the second controlled element 95 is acquired from the second controlled element 95.

Figure 2:
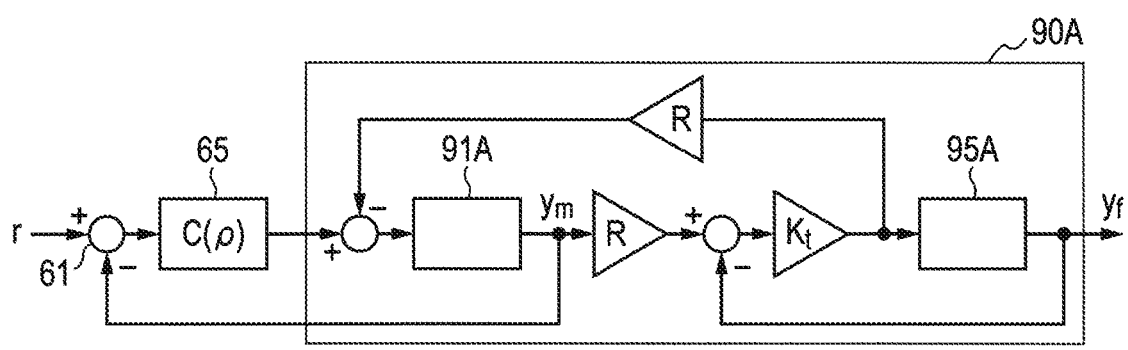
FIG. 2 is a block diagram showing an example of a controlled object.

A controlled object 90A shown in FIG. 2 is one example of the above-described the controlled object 90. The controlled object 90A includes a motor 91A as the first controlled element 91, and includes a load 95A that receives power from the motor 91A as the second controlled element 95. It may be understood that the load 95A is a machine that is driven by the motor 91A.

In this example, the control input u from the controller 60 is a drive current. The control input u may be a drive voltage. The motor 91A is driven with a drive current corresponding to the control input u, for example. The rotation amount of the motor 91A is observed as the first output ym.

According to a ball screw model, the controlled object 90A includes elements R and Kt relating to the ball screw structure, as the transfer element from the motor 91A to the load 95A. The first output ym is converted into an output Kt·(R·y−yf) and transmitted to the load 95A.

The load 95A operates by receiving action corresponding to this output Kt·(R·ym−yf), and is displaced (moves). The second output yf is the displacement amount of the load 95A. The motor 91A is driven by the amount corresponding to deviation between the control input u from the controller 60 and the output R·Kt·(R·ym−yf).

Next, details of setting processing that is executed by the processor 31 for setting the appropriate value ρ* of the parameter ρ to the control system 40 will be described. In response to input of a setting instruction, the processor 31 executes the setting processing shown in FIG. 3. For example, the setting instruction is inputted from an operator through the operation interface 37.

In response to input of the setting instruction, the processor 31 acquires sample data from the observer 20 (S110). The processor 31 may send an instruction of execution of an experimental control operation to the control system 40 through the input-output interface 35, and acquire, from the observer 20, time-series data of a combination of the control input u, the first output ym, and the second output yf that are observed by the experimental control operation as the above-mentioned sample data. Alternatively, the operator may directly manipulate the control system 40 to cause the control system 40 to execute the experimental control operation.

In the experimental control operation, the commander 50 may input a predetermined desired value r to the controller 60. For example, as indicated by the single-dot chain line in FIG. 4, a constant value r0 may be inputted as the desired value r. The observer 20 may observe the control input u, the first output ym, and the second output yf showing behavior of the control system 40 when the desired value r is inputted, and provide the setting apparatus 30 with time-series data of that combination as sample data. In the following description, the control input u, the first output ym, and the second output yf at each time indicated by the sample data are denoted as a control input u0, a first output ym0, and a second output yf0, respectively.

Subsequently, the processor 31 calculates the value ρ* of the parameter ρ that minimizes an evaluation function J(ρ) when the control input u0, the first output ym0, and the second output yf0 at each time indicated by the acquired sample data are substituted in the evaluation function J(ρ), as the value ρ* of the parameter ρ that is set to the control system 40 (S140).

The evaluation function J(ρ) may be an evaluation function J1(ρ) that follows the expressions below. That is, in S140, the processor 31 may calculate the value ρ* of the parameter ρ that minimizes the evaluation function J1(ρ) shown below.

$$J1(\rho)=\|E_f\|^2=\|y_{f0}-T_d(C(\rho)^{-1}u_0+y_{m0})\|^2$$

$$E_f(\rho,u_0,y_{m0},y_{f0})=y_{f0}-T_d(C(\rho)^{-1}u_0+y_{m0})$$

The evaluation function J1(ρ) corresponds to a norm of a function Ef(ρ,u0, ym0, yf0), specifically, L2 norm. Here, each of the control input u0, the first output ym0, and the second output yf0 in the norm is a vector that includes an observation value at each time as time-series elements. A target response transfer function Td is a model function Td that defines, as a target response, a normative value yf* of the second output yf relative to the desired value r. Specifically, the normative value yf* is defined in accordance with the expression shown below.

$$y_f^*=T_d r$$

It is preferable that the parameter ρ be set to a value that realizes the second output yf having a small error relative to the normative value yf*. Thus, the evaluation function J1(ρ) is configured to evaluate a control error of the second output yf. Specifically, as will be understood from the expressions shown below, the evaluation function J1(ρ) is configured to calculate, as a control error, an error between the observed second output yf0 and the normative value yf*(ρ) of the second output yf corresponding to the parameter ρ.

$$J1(\rho)=\|E_f\|^2=\|y_{f0}-y_f^*(\rho)\|^2$$

$$y_f^*(\rho)=T_d r^*(\rho)$$

$$r^*(\rho)=C(\rho)^{-1}u_0+y_{m0}$$

As shown above, the evaluation function J1(ρ) corresponds to the sum of squares of an error between the observed second output yf0 at each time and its normative value yf*(p). Accordingly, calculating the value ρ* of the parameter ρ that minimizes the evaluation function J1(ρ) corresponds to calculating the value ρ* of the parameter ρ that minimizes the sum of squares of the errors.

The parameter ρ may be defined by a single variable, or may be defined by a plurality of variables ρ1, ρ2, . . . , ρn (n is a natural number larger than or equal to 1). In a case where the evaluation function J1(ρ) is expressed by linear combination of ρ1, ρ2, . . . , ρn, the value ρ* that minimizes the evaluation function J1(ρ) can be calculated by using the least-square method. Other known solutions for the minimization problem may be adopted.

The evaluation function J1(ρ) is based on the FRIT technique. As another example, the evaluation function J(ρ) may be an evaluation function J2(ρ) that follows the expressions shown below, which is based on the VRFT technique. That is, in S140, the processor 31 may calculate the value ρ* of the parameter ρ that minimizes the evaluation function J2(ρ) shown below.

$$J2(\rho)=\|E_v\|^2=\|u_0-C(\rho)(T_d^{-1}y_{f0}-y_{m0})\|^2$$

$$E_v(\rho,u_0,y_{m0},y_{f0})=u_0-C(\rho)(T_d^{-1}y_{f0}-y_{m0})$$

The evaluation function J2(ρ) corresponds to a norm of a function Ev(ρ,u0, ym0,yf0), specifically, an L2 norm. Here, each of u0, ym0, and yf0 in the norm is a vector as in the evaluation function J1(ρ). As can be understood from the expressions shown below, the evaluation function J2(ρ) is configured to evaluate an error between the observed control input u0 and the normative value u0* (ρ) of the control input u0 corresponding to the parameter ρ. Specifically, the evaluation function J2(ρ) corresponds to the sum of squares of errors between the observed control input u0 at each time and its normative value u0* (ρ).

$$J2(\rho)=\|E_v\|^2=\|u_0-u^*(\rho)\|^2$$

$$u^*(\rho)=C(\rho)(r^*-y_{m0})$$

$$r^*=T_d^{-1}y_{f0}$$

The processor 31 calculates the value ρ* of the parameter ρ that minimizes the evaluation function J, specifically, the evaluation function J1(ρ) or the evaluation function J2(ρ) in this way (S140), and updates the value of the parameter ρ in the controller 60 with the calculated value ρ* (S150). Accordingly, the setting apparatus 30 forms the controller 60 that is configured to accurately control the second output yf to the normative value yf* (target response). After updating the value of the parameter ρ in the controller 60, the setting apparatus 30 ends the setting processing.

Figure 5A:
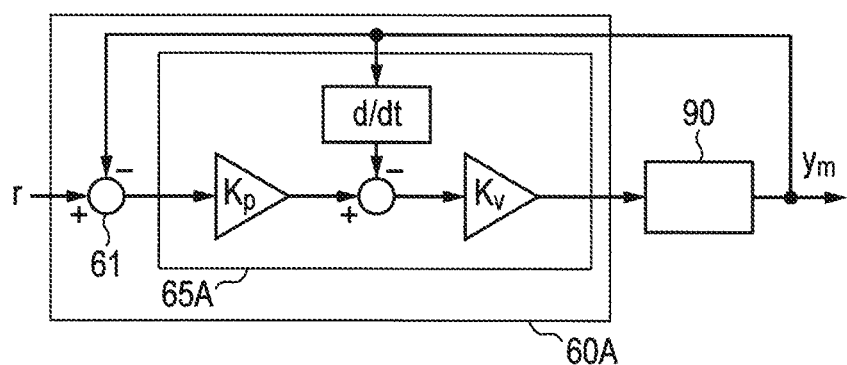
FIGS. 5A and 5B are block diagrams showing examples of a controller.

Here, experimental results relating to a control system will be described in which the controlled object 90A shown in FIG. 2 is controlled by a position-velocity controller 60A shown in FIG. 5A as an example of the controller 60. As shown in FIG. 5A, the controller 60A includes, as the main controller 65, a main controller 65A including a proportional control element relating to a position (gain Kp) and a proportional control element relating to a velocity (gain Kv). The "d/dt" shown in FIG. 5A is a time derivative element. The time derivative of the first output ym is rotation velocity of the motor 91A.

Figure 4:
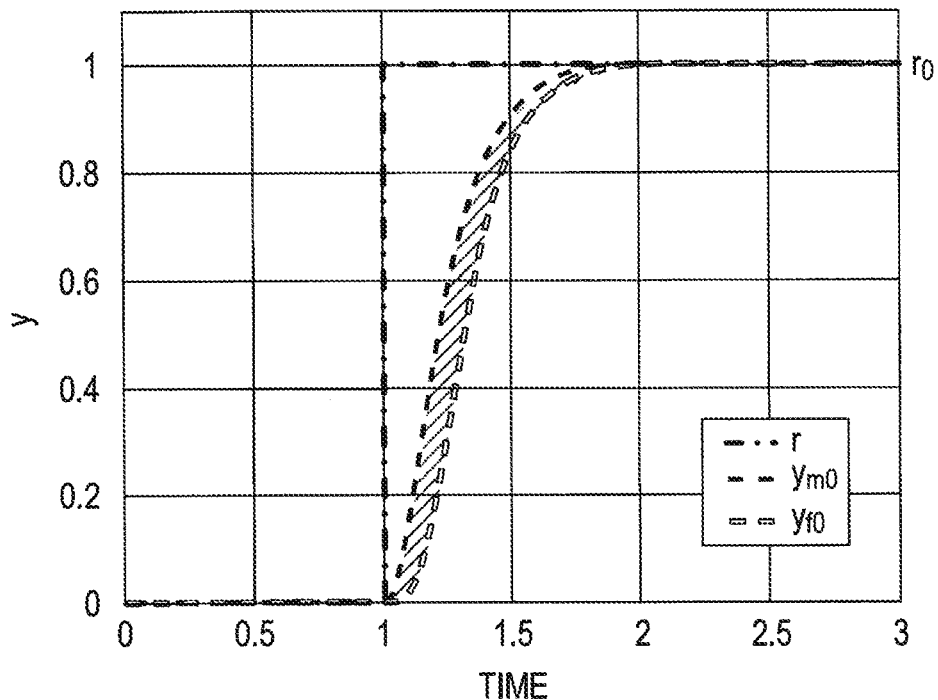
FIG. 4 is a graph showing first outputs and second outputs with desired values.

The graph in FIG. 4 shows sample data used in the experiment. In this graph, the horizontal axis is time, and the single-dot chain line shown in the graph indicates the desired value r. The black dashed line indicates the first output ym0 shown by the sample data, and the white dashed line indicates the second output yf0 shown by the sample data.

Figure 6A:
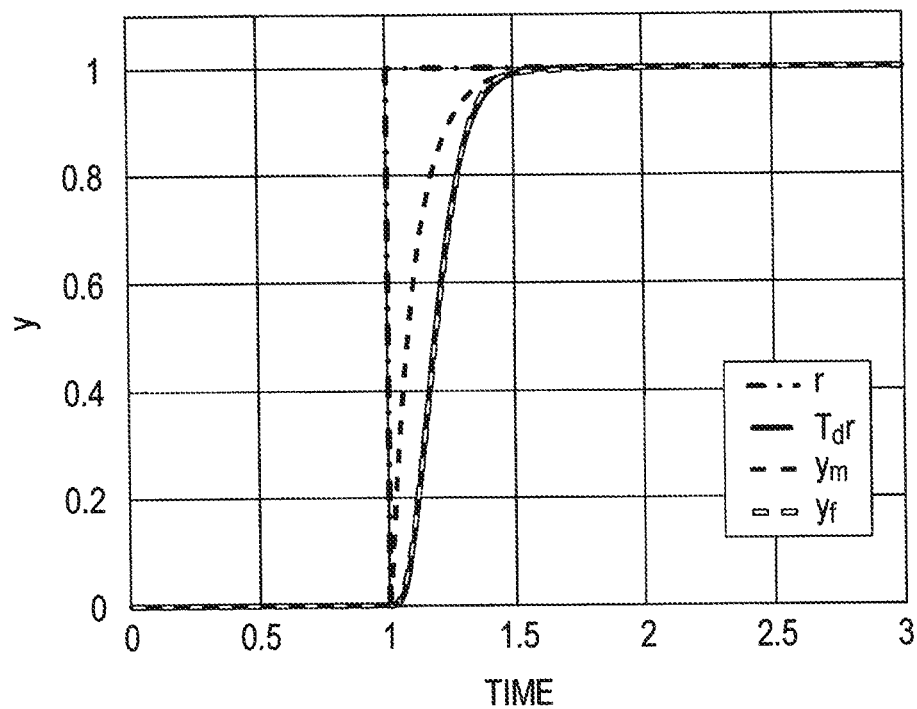
FIG. 6A is a graph showing, with target responses, first outputs and second outputs after parameters of a control system are adjusted based on technique of this disclosure.

FIG. 6A shows the operation results of the control system after the value ρ* was calculated by using the above-mentioned method based on the sample data showing this waveform and the value ρ* was set to the main controller 65A. As can be understood from FIG. 6A, the second output yf fits well with the normative value (target response) Tdr. In FIG. 6A, the single-dot chain line indicates the desired value r, the black dashed line indicates the first output ym observed after the value ρ* is set, and the white dashed line indicates the second output yf observed after the value ρ* is set. The solid line indicates the normative value Tdr.

In this experiment, specifically, the evaluation function J1(ρ) that follows the expressions shown below was used. Here, "F" is a time derivative element.

$$J1(\rho) = \|y_{f0} - T_d r^*(\rho_1, \rho_2)\|^2$$

$$r^*(\rho_1, \rho_2) = \rho_1 u_0 + \rho_2 F y_{m0} + y_{m0}$$

$$\rho_1 = \frac{1}{K_p K_v}$$

$$\rho_2 = \frac{1}{K_p}$$

$$T_d = \left(\frac{\omega^2}{s^2 + 2\zeta\omega s + \omega^2}\right)^2.$$

Figure 6B:
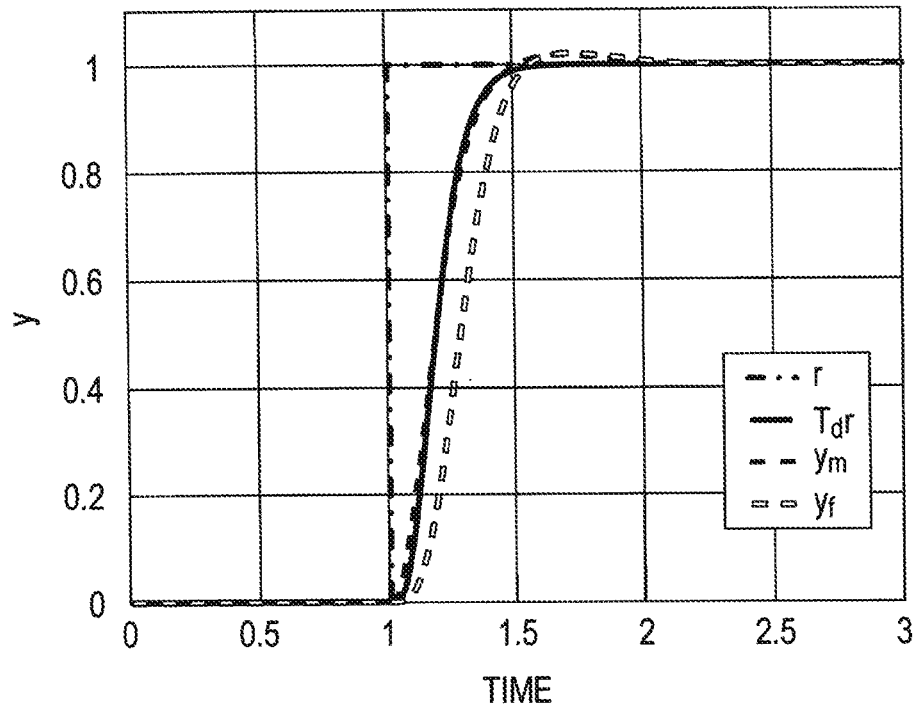
FIG. 6B is a graph showing first outputs and second outputs after the parameters of the control system are adjusted based on conventional technique.

As a comparative example, FIG. 6B shows the operation result of a control system in a case where the value of the parameter ρ of the same control system as FIG. 6A was updated by using the conventional FRIT technique, not the technique of this disclosure. The conventional FRIT technique assumes a fully closed control system. Thus, the parameter ρ is adjusted such that the first output ym, not the second output yf, fits with the normative value Tdr.

Thus, in the conventional technique, in a semi-closed control system, the parameter ρ could not be adjusted so as to appropriately control the output of the load 95A driven by the motor 91A. Accordingly, the technique of this disclosure is effective in adjustment of the parameter ρ in the semi-closed control system.

Especially, the technique of this disclosure functions effectively in an environment in which a large difference occurs between the first output ym and the second output yf. One of the causes of occurrence of this difference is transmission delay of signals and power. The technique of this disclosure is effective in the semi-closed control system in which such delay occurs.

Figure 7:
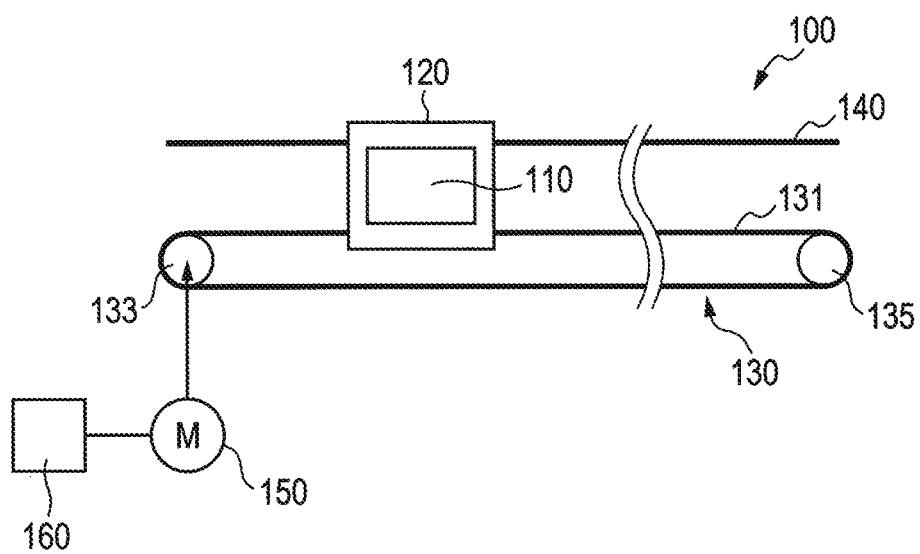
FIG. 7 is an explanatory drawing showing one example of a device to which the technique of this disclosure is applied.

Examples of a control system in which transmission delay occurs include a device that conveys a conveyed object through elastic material. A device 100 shown in FIG. 7 is configured to convey a conveyed object 110 by using a carriage 120 and a belt conveyance mechanism 130. The conveyed object 110 is a cutter for cutting paper, for example. The conveyed object 110 may be a print head such as an inkjet head. In this case, the control system is a print-head movement mechanism in a printer.

In this example, the belt conveyance mechanism 130 includes an endless belt 131 made of rubber, a conveyance roller 133, and a follow roller 135. The endless belt 131 is looped around (between) the conveyance roller 133 and the follow roller 135. When the conveyance roller 133 rotates by receiving power from a motor 150, the endless belt 131 circularly moves in synchronicity with the conveyance roller 133 by receiving action of force from the conveyance roller 133 at a contact surface with the conveyance roller 133. The follow roller 135 is rotated by rotation of the endless belt 131.

The carriage 120 is fixed to the endless belt 131, and is disposed to slide along a guide rail 140. Due to this arrangement, the movement direction of the carriage 120 is restricted to a direction parallel to the guide rail 140 and, when the endless belt 131 circularly moves, the carriage 120 and the conveyed object 110 move in a direction parallel to the guide rail 140.

In the device 100, the motor 150 corresponds to the first controlled element 91, and the conveyed object 110 or the carriage 120 corresponds to the second controlled element 95. The transfer element 93 includes the belt conveyance mechanism 130.

In this case, when the conveyed object 110 and the carriage 120 are conveyed by the motor 150 through the belt conveyance mechanism 130, the conveyed object 110 and the carriage 120 are conveyed with delay relative to the movement (rotation) of the motor 150 due to elasticity of the endless belt 131, specifically, expansion and contraction of the endless belt 131. The technique of this disclosure functions effectively when the position and velocity of the conveyed object 110 are controlled in the device 100 in which the above-described transmission delay of power may occur. That is, by applying the technique of this disclosure to the device 100, the position and velocity of the conveyed object 110 can be controlled accurately with a semi-closed control based on the first output ym that is observed by a rotary encoder 160 attached to the motor 150.

Figure 5B:
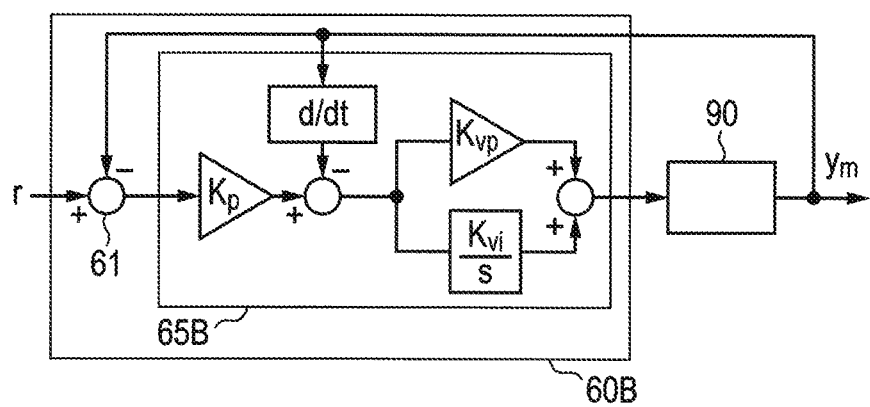
Figure 8A:
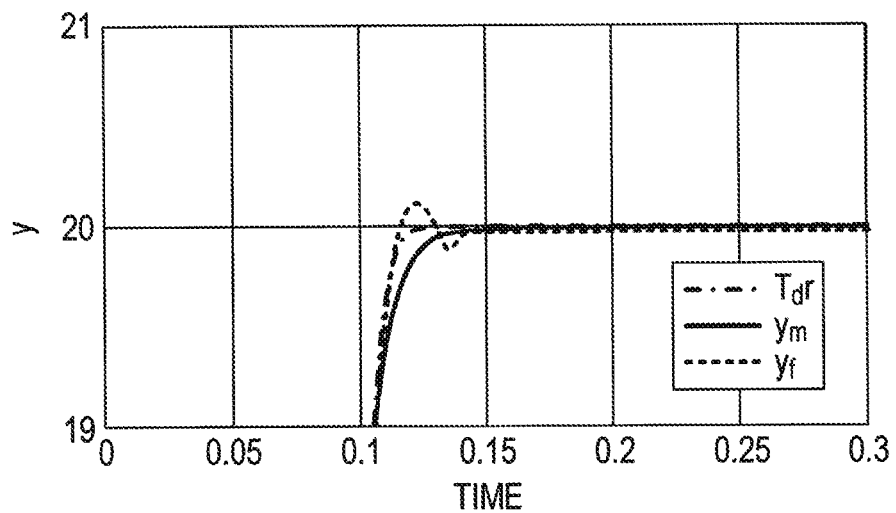
FIG. 8A is a graph showing, with target responses, first outputs and second outputs after parameters of the device are adjusted by applying the technique of this disclosure.

The graph in FIG. 8A shows trajectories of the first output ym and the second output yf when the parameter ρ of a controller 60B for controlling the device 100 is adjusted to the appropriate value ρ* by applying the technique of this disclosure and the normative value Tdr of the second output yf as the target response, where time is plotted on the horizontal axis. As shown in FIG. 5B, a main controller 65B included in the controller 60B includes a proportional control element relating to position (gain Kp) and a proportional-integral control element relating to velocity (gain Kvp, Kvi).

Figure 8B:
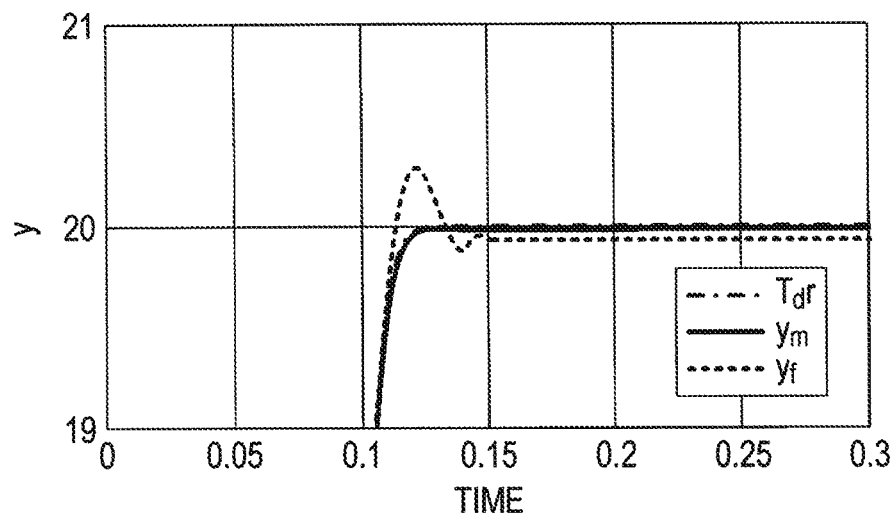
FIG. 8B is a graph showing first outputs and second outputs after the parameters of the device are adjusted based on the conventional technique.

As can be understood from FIG. 8A, in this device 100 as well, the parameter ρ of the controller 60B can be adjusted appropriately such that the second output yf fits well with the normative value Tdr. The graph in FIG. 8B shows trajectories of the first output ym and the second output yf when the parameter ρ of the controller 60B for controlling the device 100 is adjusted to the appropriate value ρ* by applying conventional technique, without applying the technique of this disclosure, and the normative value Tdr of the second output yf, where time is plotted on the horizontal axis. As can be understood from comparison between FIG. 8A and FIG. 8B, according to this embodiment, the second output yf can be controlled more accurately than the conventional technique.

It is preferable that an experimental control operation of the control system 40 performed for acquiring sample data be performed by using the desired value r that causes a large difference between the first output ym and the second output yf, in order to calculate the appropriate value ρ*. Specifically, it is preferable that an experimental control operation be performed by using the desired value r that causes the hatched area in FIG. 4 become larger (for example, rapid acceleration and deceleration of the motor). For this purpose, a designer can find the optimum desired value r and define the desired value r that is used in the experimental control operation.

Second Embodiment

Next, the setting system 10 of a second embodiment will be described. The setting system 10 of the second embodiment is the same as the one of the first embodiment, except that setting processing executed by the processor 31 is partially different from the setting processing shown in FIG. 3. Accordingly, in the following description, regarding the setting system 10 of the second embodiment, like parts and components similar to those in the first embodiment are designated by the same reference numerals to avoid duplicating description.

Figure 3:
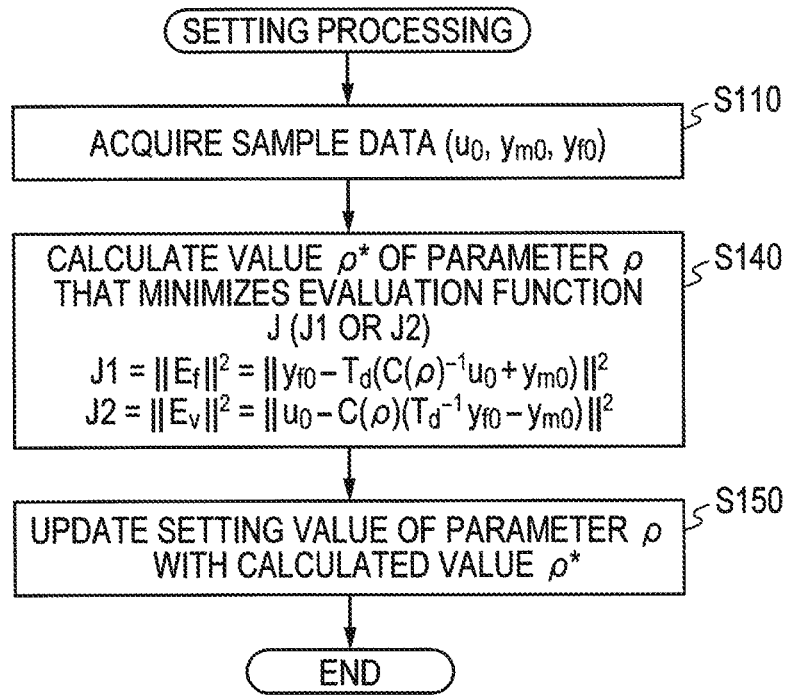
FIG. 3 is a flowchart showing setting processing executed by a processor according to a first embodiment.
Figure 9:
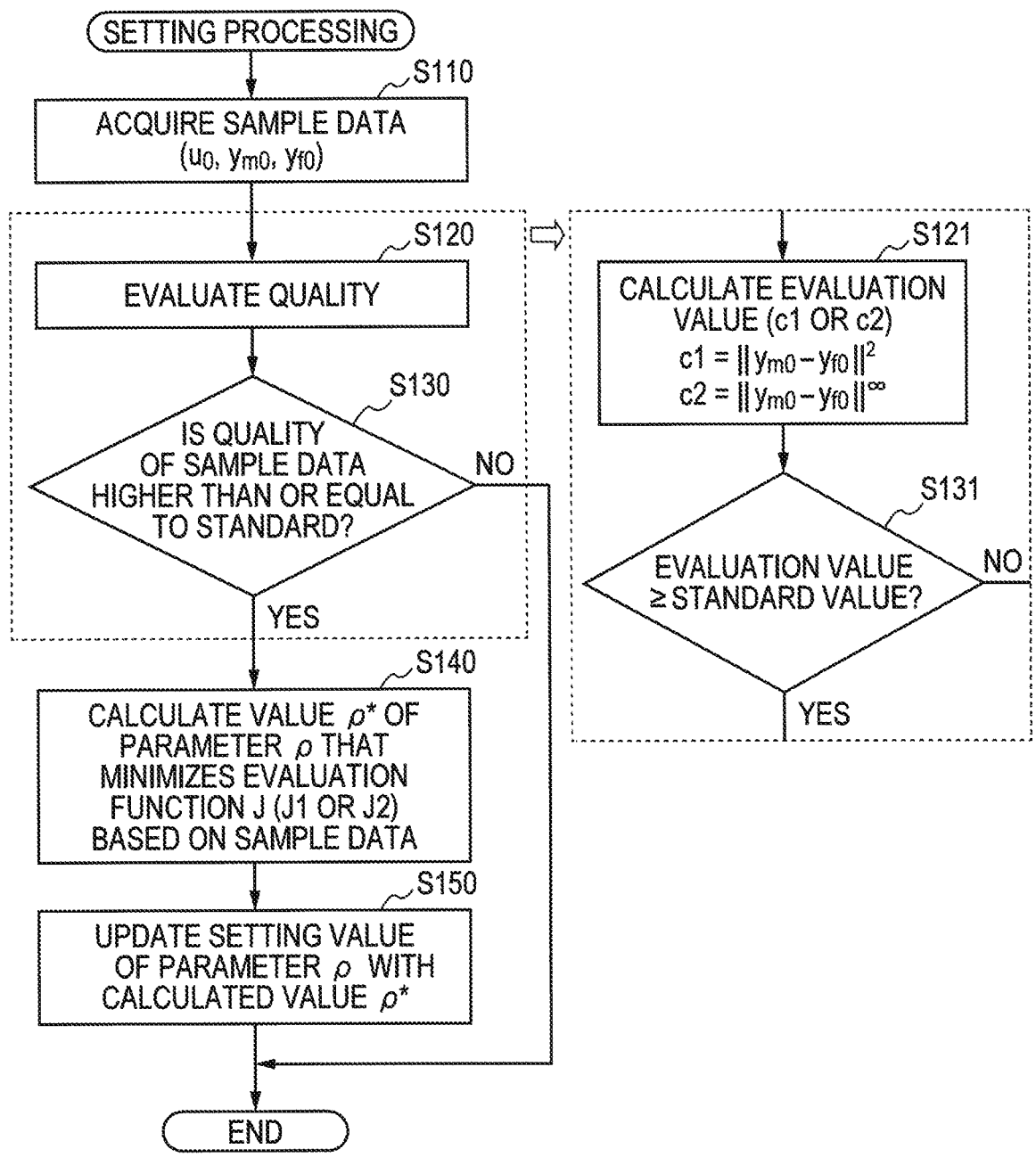
FIG. 9 is a flowchart showing setting processing according to a second embodiment.

In this embodiment, the processor 31 executes setting processing shown in FIG. 9, instead of the setting processing shown in FIG. 3. In this setting processing, the processor 31 executes the processing of S110, S140, and S150 as in the first embodiment. Further, the processor 31 executes new processing S120 and S130 between the processing of S110 and the processing of S140.

That is, after acquiring sample data from the observer 20 (S110), the processor 31 executes processing of evaluating the quality of the acquired sample data (S120). The quality evaluation is performed from the standpoint of whether a good value of the parameter ρ can be calculated. As a specific example of the processing of S120, the processor 31 may calculate an evaluation value c1 of a difference between the first output ym0 and the second output yf0 indicated by sample data, in accordance with the expression using an L2 norm shown below (S121).

$$c_1 = \|y_{m0} - y_{f0}\|^2$$

The evaluation value c1 corresponds to the sum of squares of the difference between the first output ym0 and the second output yf0 at each time. The magnitude (large or small) of the evaluation value c1 corresponds to the magnitude (large or small) of the area of the hatched area shown in FIG. 4. That is, the larger the evaluation value c1 is, the higher the quality of sample data is.

Alternatively, instead of the above-mentioned evaluation value c1, the processor 31 may calculate an evaluation value c2 that uses an infinity norm as indicated by the expression shown below $$c_2 = \|y_{m0} - y_{f0}\|^\infty$$

In S120, the quality of sample data may be evaluated by using the evaluation value c1 or the evaluation value c2. After that, the processor 31 determines whether the quality of sample data is higher than or equal to a standard (S130). In response to determining that the quality of sample data is higher than or equal to the standard (S130: Yes), the processor 31 executes the processing of S140 and S150. In response to determining that the quality of sample data is lower than the standard (S130: No), the processor 31 ends the setting processing without executing the processing of S140 and S150.

As a specific example of S130, the processor 31 may determine whether the evaluation value c1 is higher than or equal to a predetermined standard value (S131). Alternatively, the processor 31 may determine whether the evaluation value c2 is higher than or equal to a predetermined standard value.

If the value ρ* of the parameter ρ is calculated by using sample data having a large difference (large evaluation value c1, c2), compared with a case where the value ρ* is calculated by using sample data having a small difference (small evaluation value c1, c2), an appropriate value of the parameter ρ that improves control accuracy can be calculated.

In this way, the processor 31 may perform calculation and setting of the value ρ* of the parameter ρ based on the evaluation function J(ρ), only in a case where the evaluation value c1 or the evaluation value c2 is higher than or equal to the standard value. In other words, the processor 31 may operate so as not to update the parameter ρ of the control system 40 in a case where the evaluation value c1 or the evaluation value c2 is lower than the standard value.

The processing of S120 and S130 in the second embodiment is effective especially in a case where the experimental control operation of the control system 40 is performed through the user's manual operation and the quality of sample data cannot be predicted.

Alternatively, in the second embodiment, a plurality of desired values r for an experimental control operation may be provided. The processor 31 may instruct the control system 40 to execute the experimental control operation by using a desired value r selected from the plurality of desired values r, and may acquire sample data (S110).

In this case, until acquiring sample data with which the quality is higher than or equal to the standard, the processor 31 may repeatedly execute the setting processing while changing the desired value r that is used for the experimental control operation by the control system 40. With this operation, the parameter ρ of the control system 40 can be updated with a good value.

Third Embodiment

Next, the setting system 10 of a third embodiment will be described. The setting system 10 of the third embodiment is the same as the one of the first embodiment, except that setting processing executed by the processor 31 is partially different from the setting processing shown in FIG. 3. Accordingly, in the following description, regarding the setting system 10 of the third embodiment, like parts and components similar to those in the first embodiment are designated by the same reference numerals to avoid duplicating description.

In the third embodiment, a plurality of desired values r for the experimental control operation is provided. Further, the processor 31 executes the setting processing shown in FIG. 10, instead of the setting processing shown in FIG. 3. In this setting processing, the processor 31 may repeatedly execute an operation of instructing the control system 40 to execute the experimental control operation by using a desired value r selected from the plurality of desired values r, and acquiring sample data from the observer 20, thereby acquiring a plurality of sample data corresponding to respective ones of the plurality of desired values r (S210). That is, the processor 31 acquires a plurality of sample data in which the desired value r as the control condition is different from each other (S210).

After that, the processor 31 evaluates the quality of each of the plurality of sample data (S220). In S220, the processor 31 may calculate the evaluation value c1 similar to that in the second embodiment for each of the plurality of sample data. The evaluation value c2 may be calculated instead of the evaluation value c1.

In S230, the processor 31 selects the sample data of the highest quality as the sample data that is used for calculation of the appropriate value $\rho^*$ of the parameter $\rho$ (S230). Specifically, the processor 31 may select the sample data for which the evaluation value c1 calculated in S220 is the largest. Alternatively, the processor 31 may select the sample data for which the evaluation value c2 is the largest.

In S240, the processor 31 calculates the value $\rho^*$ of the parameter $\rho$ that minimizes the evaluation function $J(\rho)$ when the control input u0, the first output ym0, and the second output yf0 at each time shown by the sample data selected in S230 are substituted in the evaluation function $J(\rho)$, as the appropriate value $\rho^*$ of the parameter $\rho$ that is set to the control system 40 (S240). The used evaluation function $J(\rho)$ is the same as the one in the first embodiment. And, the processor 31 updates the parameter $\rho$ of the control system 40 with the calculated value $\rho^*$ (S250).

According to the third embodiment, the processor 31 selects sample data that is the best for calculation of the appropriate value $\rho^*$ of the parameter $\rho$ from among the plurality of sample data for which the control condition is different, and sets the appropriate value $\rho^*$ calculated based on the selected sample data to the control system 40. Thus, control accuracy of the control system 40 can be further improved.

While the disclosure has been described in detail with reference to the above aspects thereof, it would be apparent to those skilled in the art that various changes and modifications may be made therein without departing from the scope of the claims.

For example, the combination of the first controlled element 91 and the second controlled element 95 is not limited to the combination of the motor 91A and the load 95A. The combination of the first controlled element 91 and the second controlled element 95 may be a combination of an electric circuit and an electric device configured to receive electric power supply from the electric circuit and having no mechanical movable part. For example, the second controlled element 95 may be a heater, and the first controlled element 91 may be a drive circuit of the heater. This technique of this disclosure may be applied to any semi-closed control system.

Further, the setting system 10 may be formed as an apparatus separate from an apparatus including the control system 40, or may be built in the housing of the apparatus including the control system 40. In the latter case, the setting system 10 may be configured to regularly adjust the parameter $\rho$ of the control system 40. The technique of this disclosure can be used in various situations including design work of the controller 60, shipment of a product, and maintenance of a product.

A function of one element in the above-described embodiments may be distributedly provided in a plurality of elements. Functions of a plurality of elements may be integrated into one element. A part of the configuration in the above-described embodiments may be omitted. At least part of the configuration in one embodiment may be added to configurations in another embodiment, or may be replaced by a configuration in another embodiment.

What is claimed is:

1. A method comprising:
    acquiring one or more sets of time-series data including a sample u0 of a control input u, a sample ym0 of a first output ym, and a sample yf0 of a second output yf, a first controlled element being controlled based on the control input u thereby controlling the first output ym output from the first controlled element and the second output yf that is an output of a second controlled element that receives action from the first controlled element, the control input u being determined to follow a transfer function $C(\rho)$ including a parameter $\rho$ based on a desired value r and the first output ym;
    calculating a value $\rho^*$ based on the one or more sets of time-series data, the transfer function $C(\rho)$, and a model function Td that defines a normative value of the second output yf relative to the desired value r, the value $\rho^*$ being a value of the parameter $\rho$ that minimizes a control error,
    determining the control input u based on the value $\rho^*$ and the transfer function $C(\rho)$ and the desired value r and the first output ym; and
    controlling the first controlled element based on the determined control input u,
    the control error being one of:
        an error between the sample yf0 of the second output yf and the normative value of the second output yf, the normative value of the second output yf being calculated from the transfer function $C(\rho)$, the model function Td, the sample u0 of the control input u, and the sample ym0 of the first output ym; and
        an error between the sample u0 of the control input u and a normative value of the control input u, the normative value of the control input u being calculated from the transfer function $C(\rho)$, the model function Td, the sample ym0 of the first output ym, and the sample yf0 of the second output yf.

2. The method according to claim 1, wherein the control system is configured to calculate the control input u by inputting a deviation (r-ym) between the desired value r and the first output ym to the transfer function $C(\rho)$;
    wherein the calculating the value $\rho^*$ comprises calculating, based on the one or more sets of time-series data, the value $\rho^*$ of the parameter $\rho$ that minimizes a value of an evaluation function relating to the control error; and
    wherein the evaluation function corresponds to a norm of a function $E_f(\rho, u0, ym0, yf0)$ following Expression 1 where Expression 1 is $$E_f(\rho, u_0, y_{m0}, y_{f0}) = y_{f0} - T_d(C(\rho)^{-1} u_0 + y_{m0}).$$

3. The method according to claim 1, wherein the control system is configured to calculate the control input u by inputting a deviation (r-ym) between the desired value r and the first output ym to the transfer function $C(\rho)$;
    wherein the calculating the value $\rho^*$ comprises calculating, based on the one or more sets of time-series data, the value ρ* of the parameter ρ that minimizes a value of an evaluation function relating to the control error; and wherein the evaluation function corresponds to a norm of a function Ev(ρ,u0,ym0,yf0) following Expression 1, where Expression 1 is $$E_v(\rho,u_0,y_{m0},y_{f0})=u_0-C(\rho)(T_d^{-1}y_{f0}-y_{m0}).$$

4. The method according to claim 1, wherein the calculating the value ρ* comprises calculating the value ρ* based on the one or more sets of time-series data, on condition that a difference between the sample ym0 of the first output ym and the sample yf0 of the second output yf is larger than or equal to a standard.

5. The method according to claim 4, further comprising calculating, as an evaluation value of the difference between the sample ym0 and the sample yf0, a sum of squares of the difference between the sample ym0 and the sample yf0 at each time.

6. The method according to claim 1, wherein the acquiring the one or more sets of time-series data comprises acquiring a plurality sets of time-series data including the sample u0 of the control input u, the sample ym0 of the first output ym, and the sample yf0 of the second output yf that are observed when the control system is operated in each of a plurality of control conditions;

wherein the method further comprises:
    evaluating the difference between the sample ym0 of the first output ym and the sample yf0 of the second output yf in each of the plurality sets of time-series data; and
    select, as reference data, one of the plurality sets of time-series data based on an evaluation value of the difference; and
wherein the calculating the value ρ* comprises calculating the value ρ* based on the reference data.

7. The method according to claim 1, wherein the first controlled element is a motor, and the second controlled element is a load that is driven by the motor.

8. The method according to claim 1, wherein the second controlled element is driven by the first controlled element through a transfer element in which delay occurs in transmission of power.

9. The method according to claim 8, wherein the control system is a print-head movement mechanism in a printer;
    wherein the first controlled element is a motor configured to be driven with a drive current or a drive voltage as the control input u, the motor being attached to a rotary encoder configured to observe the first output ym;
    wherein the transfer element is a belt conveyance mechanism including an endless belt, the endless belt being moved by the motor; and
    wherein the second controlled element is a carriage on which a print head is mounted, the carriage being fixed to the endless belt such that the carriage is conveyed by the motor through the belt conveyance mechanism.

10. An information processing apparatus comprising:
an interface; and
a processor configured to perform:
    acquiring, through the interface, one or more sets of time-series data from a control system comprising a first controlled element that is controlled by manipulating the first controlled element based on a control input u and has a first output ym, the control input u follows a transfer function C(ρ) including the parameter ρ based on a desired value r; and a second controlled element that receives action from the first controlled element and has a second output yf; the one or more sets of time-series data including a sample u0 of the control input u, a sample ym0 of the first output ym, and a sample yf0 of the second output yf;
    calculating a value ρ* based on the one or more sets of time-series data, the transfer function C(ρ), and a model function Td that defines a normative value of the second output yf relative to the desired value r, the value ρ* being a value of the parameter ρ that minimizes a control error and that is to be set; and
    transferring the value ρ* to another processor of the control system,
wherein the another processor is configured to determine the control input u based on the value ρ* and the transfer function C(ρ) and the desired value r and the first output ym and control the first controlled element based on the determined control input u,
the control error being one of:
    an error between the sample yf0 of the second output yf and the normative value of the second output yf, the normative value of the second output yf being calculated from the transfer function C(ρ), the model function Td, the sample u0 of the control input u, and the sample ym0 of the first output ym; and
    an error between the sample u0 of the control input u and a normative value of the control input u, the normative value of the control input u being calculated from the transfer function C(ρ), the model function Td, the sample ym0 of the first output ym, and the sample yf0 of the second output yf.

11. A non-transitory computer-readable storage medium storing a set of program instructions for an information processing apparatus, the information processing apparatus communicable with a control system, the control system comprising a first controlled element that is controlled by manipulating the first controlled element based on a control input u and has a first output ym, the control input u follows a transfer function C(ρ) including the parameter ρ based on a desired value r and a second controlled element that receives action from the first controlled element and has a second output yf, the set of program instructions, when executed by a processor of the information processing apparatus, causing the information processing apparatus to perform:
    acquiring one or more sets of time-series data including a sample u0 of the control input u, a sample ym0 of the first output ym, and a sample yf0 of the second output yf;
    calculating a value ρ* based on the one or more sets of time-series data, the transfer function C(ρ), and a model function Td that defines a normative value of the second output yf relative to the desired value r, the value ρ* being a value of the parameter ρ that minimizes a control error and that is to be set; and
    transferring the value ρ* to another processor of the control system which determines the control input u based on the value ρ* and the transfer function C(ρ) and the desired value r and the first output ym and controls the first controlled element based on the determined control input,
the control error being one of:
    an error between the sample yf0 of the second output yf and the normative value of the second output yf, the normative value of the second output yf being calculated from the transfer function $C(\rho)$, the model function Td, the sample u0 of the control input u, and the sample ym0 of the first output ym; and an error between the sample u0 of the control input u and a normative value of the control input u, the normative value of the control input u being calculated from the transfer function $C(\rho)$, the model function Td, the sample ym0 of the first output ym, and the sample yf0 of the second output yf.

\* \* \* \* \*